United States Patent
Griswold et al.

(10) Patent No.: US 7,956,123 B2
(45) Date of Patent: Jun. 7, 2011

(54) SOLVENT RESISTANT POLYURETHANE ADHESIVE COMPOSITIONS

(75) Inventors: Roy Melvin Griswold, Ballston Spa, NY (US); Richard P. Eckberg, Saratoga Springs, NY (US); Mark J. Bisaillon, Saratoga Springs, NY (US); Robert L. Frye, Concord, OH (US)

(73) Assignee: Momentive Performance Materials Inc., Albany, NY (US)

( * ) Notice: Subject to any disclaimer, the term of this patent is extended or adjusted under 35 U.S.C. 154(b) by 321 days.

(21) Appl. No.: 11/257,169

(22) Filed: Oct. 24, 2005

(65) Prior Publication Data

US 2007/0093595 A1    Apr. 26, 2007

(51) Int. Cl.
C08G 18/32    (2006.01)
C08G 77/12    (2006.01)
C08G 18/62    (2006.01)
C08G 18/69    (2006.01)
C08L 75/14    (2006.01)
C08F 283/12   (2006.01)

(52) U.S. Cl. ......... 524/589; 524/590; 528/28; 528/52; 525/69; 525/455; 525/458

(58) Field of Classification Search .......... 524/589, 524/590, 591; 525/232, 452, 454, 474, 477, 525/69, 455, 458; 528/25, 28, 31, 52
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,344,111 A | 9/1967 | Chalk | |
| 3,419,593 A | 12/1968 | Willing | |
| 3,445,420 A | 5/1969 | Kookootsedes et al. | |
| 3,461,185 A | 8/1969 | Brown | |
| 3,715,334 A | 2/1973 | Karstedt | |
| 3,775,452 A | 11/1973 | Karstedt | |
| 3,814,730 A | 6/1974 | Karstedt | |
| 3,882,083 A | 5/1975 | Berger et al. | |
| 3,989,667 A | 11/1976 | Lee et al. | |
| 4,043,977 A | 8/1977 | deMontigny et al. | |
| 4,061,609 A | 12/1977 | Bobear | |
| 4,230,815 A * | 10/1980 | Itoh et al. ............... | 526/335 |
| 4,256,870 A | 3/1981 | Eckberg | |
| 4,337,332 A | 6/1982 | Melancon et al. | |
| 4,347,346 A | 8/1982 | Eckberg | |
| 4,442,039 A * | 4/1984 | Murphy et al. ........... | 558/377 |
| 4,465,818 A | 8/1984 | Shirahata et al. | |
| 4,472,563 A | 9/1984 | Chandra et al. | |
| 4,476,166 A | 10/1984 | Eckberg | |
| 4,499,233 A * | 2/1985 | Tetenbaum et al. ...... | 524/591 |
| 4,533,575 A | 8/1985 | Melancon | |
| 4,562,096 A | 12/1985 | Lo et al. | |
| 4,614,761 A * | 9/1986 | Takiyama et al. ........ | 525/59 |
| 4,690,955 A * | 9/1987 | Kilgour et al. ........... | 521/112 |
| 4,714,739 A * | 12/1987 | Arkles ..................... | 525/92 G |
| 5,149,742 A | 9/1992 | Hemel et al. | |
| 5,223,575 A | 6/1993 | Mori et al. | |
| 5,376,745 A | 12/1994 | Handlin, Jr. et al. | |
| 5,391,637 A | 2/1995 | Willis et al. | |
| 5,391,663 A | 2/1995 | Bening et al. | |
| 5,393,843 A | 2/1995 | Handlin, Jr. et al. | |
| 5,405,911 A | 4/1995 | Handlin, Jr. et al. | |
| 5,416,168 A | 5/1995 | Willis et al. | |
| 5,418,296 A | 5/1995 | Willis et al. | |
| 5,506,289 A | 4/1996 | McDermott et al. | |
| 5,672,653 A * | 9/1997 | Frisch et al. ............. | 524/591 |
| 6,121,354 A * | 9/2000 | Chronister ............... | 524/262 |
| 6,262,217 B1 * | 7/2001 | Tallmadge et al. ........ | 528/64 |
| 6,271,309 B1 * | 8/2001 | Roberts et al. ........... | 525/106 |
| 6,384,171 B1 * | 5/2002 | Yamazaki et al. ........ | 528/15 |
| 6,387,487 B1 * | 5/2002 | Greenberg et al. ....... | 428/355 R |
| 6,559,260 B1 * | 5/2003 | Fan et al. ................. | 526/301 |
| 6,632,522 B1 * | 10/2003 | Hyde et al. .............. | 428/355 R |
| 6,737,477 B1 * | 5/2004 | Figge ...................... | 525/131 |
| 6,747,097 B2 * | 6/2004 | Chao et al. .............. | 525/232 |
| 6,806,339 B2 * | 10/2004 | Cray et al. .............. | 528/15 |
| 6,825,241 B1 * | 11/2004 | Blum et al. .............. | 522/96 |
| 6,831,130 B2 * | 12/2004 | Fujita et al. ............. | 525/101 |
| 6,890,601 B2 * | 5/2005 | Griswold et al. ......... | 427/387 |
| 6,924,000 B2 * | 8/2005 | Tallmadge ............... | 427/206 |
| 7,001,975 B2 * | 2/2006 | Bremser et al. .......... | 528/75 |
| 2003/0109623 A1 * | 6/2003 | Gornowicz et al. ....... | 524/492 |
| 2003/0166756 A1 * | 9/2003 | Hasegawa et al. ........ | 524/425 |
| 2003/0166818 A1 * | 9/2003 | Griswold et al. ......... | 528/34 |
| 2004/0067371 A1 * | 4/2004 | Sumita et al. ............ | 428/447 |
| 2004/0122176 A1 | 6/2004 | Chao et al. | |
| 2004/0127674 A1 | 7/2004 | Haubennestel et al. | |
| 2004/0161618 A1 * | 8/2004 | Griswold et al. ......... | 428/447 |
| 2004/0234487 A1 * | 11/2004 | Bremser et al. .......... | 424/70.17 |
| 2004/0254274 A1 * | 12/2004 | Griswold ................ | 524/261 |
| 2005/0137375 A1 * | 6/2005 | Hansen et al. ........... | 528/44 |

(Continued)

FOREIGN PATENT DOCUMENTS

JP    56-082863    7/1981

(Continued)

Primary Examiner — Mark Eashoo
Assistant Examiner — Michael Pepitone
(74) Attorney, Agent, or Firm — Dominick G. Vicari; Joseph S. Ostroff; Wiggin and Dana LLP

(57) ABSTRACT

A solvent resistant adhesive obtained by the crosslinking of a hydroxyl or urea or hydrocarbon terminated unsaturated polyurethane or polyurethane-urea polymer with a peroxide or a silicone hydride. The adhesive is useful as a component in pressure sensitive adhesives.

20 Claims, No Drawings

U.S. PATENT DOCUMENTS

2006/0247369 A1 * 11/2006 Griswold et al. ............ 524/588
2006/0247370 A1 * 11/2006 Frye et al. .................... 524/588

FOREIGN PATENT DOCUMENTS

| | | |
|---|---|---|
| JP | 57-207663 | 12/1982 |
| JP | 59-172575 | 9/1984 |
| JP | 59-174672 | 10/1984 |
| JP | 61-047774 | 3/1986 |
| JP | 61-218631 | 9/1986 |
| JP | 61-218672 | 9/1986 |
| JP | 62-057478 | 3/1987 |
| JP | 62-057479 | 3/1987 |
| JP | 62-057480 | 3/1987 |
| JP | 62-089782 | 4/1987 |
| JP | 03-259981 | 11/1991 |
| JP | 09-165565 | 6/1997 |
| WO | WO 2006/118766 | 11/2006 |

* cited by examiner

SOLVENT RESISTANT POLYURETHANE ADHESIVE COMPOSITIONS

BACKGROUND OF THE INVENTION

This invention relates to adhesive compositions.

There are certain adhesive applications for which solvent resistance is highly desirable. These include automotive, aerospace, industrial and consumer labels where exposure to aromatic aliphatic solvents and oils occurs. Solvent resistant adhesives are also required for labels used by analytical laboratories such as environmental or medical labs to prevent loss of critical sample identification information. Further applications include electronic labels or masked areas under going further processes; dry cleaning labels for garments; degreasing operations where identification labels or masked off areas are required. Adhesive properties of many pressure sensitive or heat activated adhesives are well suited for use with labels on various substrates, however these are not solvent resistant and therefore it is highly desirable that a solvent-resistant adhesive be provided.

US20040122176A1 Chao, H. discloses compositions of non-branched and branched polybutadienes with terminal hydroxyl functionality reacted with polyisocyanates that are chain extended with difunctional chain extender. No mention is made for chain termination with a monofunctional composition such as an alcohol, monoisocyanate or the crosslinking via peroxides or silicone hydrosilylation.

U.S. Pat. No. 5,223,575 Mori, M. discloses moisture crosslinkable primer compositions for polyolefins comprising the reaction product of a hydrogenated polybutadiene, polyisocyanate prepolymer with 0.1 to 10 wt % isocyanate content further reacted with an aminosilane. No disclosure of peroxide crosslinking is made and the hydrogenated polybutadiene compositions disclosed would not be reactive by silicone hydrosilylation for further crosslinking.

Solvent resistant adhesives are disclosed in the art. For example JP 56082863 Sadamitsu, K., et. al., teaches a thermoplastic polystyrene-polybutadiene block copolymer or a mixture thereof with another thermoplastic rubber of ethylene-vinyl acetate copolymer combined with of an acryl-modified polybutadiene.

JP 57207663 Ueno, H. discloses a compound comprised of ethylenic ionomer resin, a polyurethane resin, a polyethylene resin, a polyamide resin, a polyester resin, an agent for the thermal curing of a synthetic resin, and a thickener.

JP 59172575 Mishima, M. et. al., discloses a solvent resistant hot-melt adhesive comprised of a polyester amide polyurethane containing terminal alkoxyl groups prepared by reacting an aminoalkylalkoxysilane compound with a polyester-amide containing terminal isocyanate groups.

JP 59174672 Mishima, M. et. al., discloses a solvent resistant acrylic adhesive comprised of the reaction product of a vinyl compound (e.g., methyl acrylate, isobutyl methacrylate, etc.) and a vinyl dioxazolone compound.

JP 61047774 Okada, C. et. al., discloses a solvent resistant adhesive comprised of amino group terminated polyamide resin reacted with a isocyanate group-containing alkoxysilane that is the addition product of for example hexamethylene diisocyanate and 3-aminopropyltriethoxy-silane.

JP 61218631 Okada, C. et. al., discloses a solvent resistant adhesive comprised of a silane modified polyester resin obtained by reacting a polyester resin containing a hydroxyl group with an isocyanate group-containing hydrolyzable organosilicon compound.

JP 61218672 Mishima, M. et. al., discloses a solvent resistant acrylic adhesive comprised of an unsaturated polyester resin having terminal ethylenic groups the reaction product of a ethylenic compound having isocyanate groups with terminal hydroxyl groups or carboxyl groups of an unsaturated polyester resin.

JP 61218673 Mishima, M. et. al., further discloses a solvent resistant acrylic adhesive comprised of an unsaturated polyester resin having terminal ethylenic double bonds obtained by reacting epoxy (meth) acrylate with the terminal carboxyl groups of an unsaturated polyester resin having ethylenic double bond in the molecule.

JP 62057480 Yamazaki, H. et. al., discloses a solvent resistant adhesive comprised of a polyamide resin having terminal ethylenic double bonds obtained by reacting a compound having aziridinyl and ethylenic groups with terminal carboxyl groups of a polyamide resin.

JP 62057479 Yamazaki, H. et. al., discloses a solvent resistant adhesive comprised of an unsaturated polyester resin having both terminal and in chain ethylenic double bonds obtained by reacting a compound having aziridinyl and ethylenic groups with terminal carboxyl groups of an unsaturated polyester resin.

JP 62057478 Yamazaki, H. et. al., discloses a solvent resistant adhesive comprised of an unsaturated polyester resin having terminal and in chain ethylenic double bonds obtained by reacting a terminal hydroxyl group of an unsaturated polyester resin with an epoxy (meth)acrylate.

JP 62089782 Oguro, K. et. al., discloses a solvent resistant adhesive obtained by reaction between a high-molecular weight diol preferably a polyester diol of polyethylene-butylene-adipate, a divalent isocyanate compound, a chain extender and a hindered nitrogen atom compound such as containing a piperizine ring.

JP 61218631 Okada, C., discloses a solvent resistant adhesive comprised of a polyamide resin having terminal amino groups reacted with a (meth)acrylic monomer such as an isocyanate-modified (meth)acrylate to give a polyamide resin having (meth)acryloyl groups. A radical generator such as a peroxide is used to cure said compositions.

JP 03259981 Nishikawa, A. et. al., discloses a solvent resistant adhesive comprised of a composition prepared by compounding a block copolymer and an isocyanate pre-polymer. The block copolymer comprises a block consisting of at least two kinds of aromatic vinyl monomers and a block consisting of at least one kind of a conjugated diene monomer, and at least 50% of carbon-carbon double bonds in the block consisting of the diene monomer have been hydrogenated (e.g., a hydrogenated styrene-isoprene-styrene triblock copolymer). The isocyanate pre-polymer is obtained by reacting an isocyanate compound with a liquid polymer which comprises a polymer of isoprene or isoprene-butadiene mixture and has 1.5-5.0 hydroxyl groups in the molecule and in which at least 50% of carbon-carbon double bonds have been hydrogenated.

JP 09165565 Nishikawa, A. et. al., discloses a solvent resistant adhesive comprised of blending a base polymer with a tackifier resin and optionally a softening agent or a wax, a block copolymer which comprises one or more hydrogenated butadiene polymer blocks, one or more of aromatic vinyl compound polymer blocks and one or more polymer blocks substantially having an olefin polymer structure.

BRIEF DESCRIPTION OF THE INVENTION

In accordance with the present invention a solvent resistant adhesive composition is provided. The solvent resistant adhesive is obtained by the crosslinking of a hydroxyl or urea or hydrocarbon terminated unsaturated polyurethane or polyurethane-urea with an organic peroxide or a silicone hydride.

The adhesive composition is useful, for example, as a component for pressure sensitive adhesives.

DETAILED DESCRIPTION OF THE INVENTION

The polyurethane polymer of this invention is derived from an unsaturated polyol such as hydroxyl-terminated vinyl-containing polymer, which is reacted with a polyisocyanate to provide an unsaturated hydroxyl-terminated polyurethane or polyurethane-urea, urea-terminated polyurethane or polyurethane-urea, or hydrocarbon-terminated polyurethane or polyurethane-urea. The hydroxyl-terminated vinyl-containing polymer is preferably a polybutadiene, although any other vinyl-containing polymer suitable for the purposes described herein can be used. Other unsaturated polyols include polyester and acrylic polymers. The invention is described below with specific reference to polybutadienes. The unsaturated polyurethane or polyurethane-urea is then cross linked with a peroxide or, more preferably, a silicone hydride such as described below, to provide a component for a pressure sensitive adhesive composition.

A. The Hydroxy-Terminated Polybutadiene Polyurethane or Polyurethane-Urea

The hydroxyl-terminated polybutadiene-based polyurethane or polyurethane-urea polymer is obtained by reacting one or more hydroxyl-terminated, optionally hydrogenated, linear or branched polybutadiene homopolymers or copolymers with an organic polyisocyanate, e.g., an organic diisocyanate, or a blend of an organic diisocyanate and an organic polyisocyanate where there are greater than two NCO groups per molecule, optionally together with one or more other difunctional compounds and/or hydroxyl-terminated polymers, to provide a hydroxyl-terminated polyurethane or polyurethane-urea polymer when the total equivalents of hydroxyl functionality exceeds the total equivalents of isocyanate functionality. In the case of polyurethane-urea compositions amine chain extender(s) are incorporated so as to yield a hydroxyl-terminated polymer. Suitable amine chain extenders are given below.

Hydroxyl-terminated polyurethane or polyurethane-urea polymers, useful in the present invention, can be prepared by the reaction of an organic polyisocyanate, e.g., a diisocyanate such as any of those mentioned above, and advantageously isophorone diisocyanate, or a blend of an organic diisocyanate and an organic polyisocyanate where there are greater than two NCO groups per molecule, with a stoichiometric excess of the selected hydroxyl-terminated polybutadiene homopolymer(s) and/or copolymer(s). Depending on the reactivity of the respective reactants, a catalyst such as any of those mentioned below can be employed. The reaction temperature is typically in the range of from about 60° C. to about 90° C. The reaction time is typically on the order of from about 2 to about 16 hours. The reaction mixture can also contain one or more chain extenders and/or other polyols such as any of those mentioned above. Optionally, a solvent or blend of solvents may be used.

To prepare the hydroxyl group-terminated polyurethane polymers, at least a slight molar excess of the hydroxyl equivalents (OH groups) with respect to the NCO isocyanate equivalents (NCO groups) is employed to terminate the polybutadiene chains with hydroxyl groups. Advantageously, the molar ratio of NCO to OH is from about 0.3 to about 0.99, and more preferably from about 0.5 to about 0.95, depending on the specific hydroxyl-terminated polybutadiene employed.

B. The Urea-Terminated Polybutadiene Polyurethane or Polyurethane-Urea

The urea-terminated polybutadiene-based polyurethane or polyurethane-urea polymer is obtained by reacting one or more hydroxyl-terminated, optionally hydrogenated, linear or branched polybutadiene homopolymers or copolymers with an organic polyisocyanate, e.g., an organic diisocyanate, or a blend of an organic diisocyanate and an organic polyisocyanate where there are greater than two NCO groups per molecule, optionally together with one or more other difunctional compounds and/or hydroxyl-terminated polymers, to provide an isocyanate-terminated polyurethane or polyurethane-urea polymer when the total equivalents of isocyanate functionality exceeds the total equivalents of hydroxyl functionality. In the case of polyurethane-urea compositions amine chain extender(s) are incorporated so as to yield an isocyanate-terminated polymer. Example amine chain extenders are given below.

Urea-terminated polyurethane or polyurethane-urea polymers, useful in the present invention, can be prepared by the reaction of an organic polyisocyanate, e.g., a diisocyanate such as any of those mentioned above, and advantageously isophorone diisocyanate, or a blend of an organic diisocyanate and an organic polyisocyanate where there are greater than two NCO groups per molecule, with a stoichiometric deficiency of the selected hydroxyl-terminated polybutadiene homopolymer(s) and/or copolymer(s). The reaction is taken to a predetermined NCO concentration (measured as weight % NCO) at which point a primary or secondary organic amine is added. The amine reacts with the remaining isocyanate groups to form urea-terminated groups. Suitable primary or secondary organic amines in the case of the urea-terminated polybutadiene polyurethanes include but not limited to ethylamine, diethylamine, butylamine, dibutylamine, ethylbutylamine, and the like. Depending on the reactivity of the respective reactants, a catalyst such as any of those mentioned above can be employed. The reaction temperature is typically in the range of from about 60° C. to about 90° C. The reaction time is typically on the order of from about 2 to about 16 hours. The reaction mixture can also contain one or more chain extenders and/or other polyols such as any of those mentioned above. Optionally, a solvent or blend of solvents may be used.

To prepare the urea group-terminated polyurethane polymers, at least a slight molar excess of the NCO equivalents (NCO groups) with respect to the OH equivalents (OH groups) is employed to terminate the polybutadiene chains with isocyanate groups. Advantageously, the molar ratio of NCO to OH is from about 1.02 to about 2, and more preferably from about 1.05 to about 1.5, depending on the specific urea-terminated polybutadiene employed.

B. Hydrocarbon-Terminated Polybutadiene Polyurethane or Polyurethane-Urea

The hydroxyl-terminated polybutadiene polyurethane or polyurethane-urea polymer described above can be hydrocarbon-terminated using a monoisocyanate, i.e., tolueneisocyanate, to react with hydroxyl groups of the hydroxyl-terminated unsaturated polyurethanes disclosed above. A stoichiometric amount of the monoisocyanate is reacted, or preferably a slight excess, i.e., about 1.02 NCO/OH, to provide a hydrocarbon-terminated polybutadiene polyurethane.

Furthermore, the isocyanate-terminated polyurethane or polyurethane-urea polymer described above can be reacted with monohydric alcohols such as methanol, ethanol, and the like to provide hydrocarbon-terminated unsaturated polybutadiene polyurethane or polyurethane-urea free of isocyanate functionality.

Among the hydroxyl-terminated polybutadienes that are useful for preparing the hydroxyl-terminated polyurethane polymers are those possessing a number average molecular weight (Mn) of from about 500 to about 10,000, and advantageously from about 800 to about 5,000, a primary hydroxyl group content of from about 0.1 to about 2.0 meq/g, and advantageously from about 0.3 to about 1.8 meq/g, a degree of hydrogenation of from 0 up to 100 percent of the olefinic sites present and an average content of copolymerized additional monomer(s) of from 0 up to about 50 weight percent.

Hydroxyl-terminated polybutadienes of the above-described type, averaging more than one predominantly primary hydroxyl group per molecule, e.g., averaging from about 1.5 to about 3 or more primary hydroxyl groups per molecule, are suitably employed herein. The branched hydroxyl-terminated polybutadienes will possess an average of at least about 2, and advantageously from about 2.4 up to about 2.8, hydroxyl groups per molecule, the hydroxyl groups being predominantly in terminal positions on the main, i.e., the terminal hydroxyl groups of the polymer, are bonded to carbon atoms adjacent to double bonded carbon atoms.

The ratio of cis-1,4, trans-1,4 and 1,2-vinyl unsaturation which occurs in the polybutadiene polymers employed in this invention is not critical to this invention, however for silicone hydrosilylation 1,2-vinyl unsaturation is preferred; the number and location of the hydroxyl groups and the molecular weight of the polybutadiene polymers will be influenced by the process employed for their manufacture, the details of which are known in the art as for example found in U.S. Pat. Nos. 5,376,745, 5,391,663, 5,393,843, 5,405,911, 5,416,168, 5,391,637, 5,393,843, 5,418,296 which are herein incorporated by reference.

Hydroxyl-terminated polybutadienes possessing these characteristics are commercially available from several sources and are therefore conveniently employed herein.

The useful hydroxyl-terminated polybutadienes herein can also incorporate one or more other copolymerizable monomers that can confer particularly desirable properties upon the polymers herein and the pressure sensitive adhesive compositions prepared therewith. The total amount of copolymerized monomer will not exceed, on average, 50 weight percent of the hydroxyl-terminated polybutadiene copolymer. Included among the copolymerizable monomers are monoolefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

In addition to the hydroxyl-terminated butadiene-based polymer, the reaction mixture can contain one or more chain extenders and/or one or more other polyols. Examples of suitable chain extenders are polyhydric alcohols such as ethylene glycol, propylene glycol, propane-1,3-diol, butane-1,4-diol, hexane-1,6-diol, 1,4-cyclohexanedimethanol, diethylene glycol, triethylene glycol, tetraethylene glycol, dipropylene glycol, triethylene glycol, tetrathylene glycol, dipropylene glycol, tripropylene glycol, tetrapropylene glycol, or diamines such as 1,3-diaminopropane, 1,4-diaminocyclohexane, 4,4'-methylenebis(2-methylcyclohexylamine), N,N'-diethyl-1,3-propanediamine, 3-aminomethyl-3,5,5-tri-methylcyclohexylamine, 3-(2-propylaminomethyl-3,5,5-trimethylcyclohexyl-(2-propylamine), and the like.

Additional polyols include polyether polyols, polyester polyols, polyetherester polyols, polybutadienediols, polyoxyalkylene diols, polyoxyalkylene triols, polytetramethylene glycols, polycaprolactone diols and triols, and the like, all of which possess at least two primary hydroxyl groups.

Suitable organic polyisocyanates include any of the known and conventional organic polyisocyanates, especially organic diisocyanates, from which polyurethane polymers have heretofore been prepared. Useful diisocyanates include, for example, 2,4-toluene diisocyanate, 2,6-toluene diisocyanate, 4,4'-diphenyl-methanediisocyanate, isophorone diisocyanate, dicyclohexylmethane-4,4'-diisocyanate, various liquid diphenylmethane-diisocyantes containing a mixture of 2,4- and 4,4' isomers, Desmodur N® (Bayer) and the like, and mixtures thereof. Isophorone diisocyanate is especially advantageous for use in preparing the polyurethane polymers herein.

Suitable catalysts useful in the preparation of the polyurethane polymers are dialkyltin dicarboxylates such as dibutyltin dilaurate, dibutyltin acetate and dimethylbis[(1-oxoneodecyl)oxy]stannane, tertiary amines, the stannous salts of carboxylic acids such as stannous octoate and stannous acetate, and the like.

C. Crosslinking the Polyurethane

In an embodiment of the invention, the unsaturated polyurethane or polyurethane-urea is crosslinked by reaction with a crosslinking agent such as organic peroxide or, more preferably, a silicone hydride such as that described below.

Suitable organic peroxides include dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl per-3,5,5-trimethylhexanoate, or tert-butyl per-2-ethylhexanoate. Benzoyl peroxide is a preferred peroxide.

In another embodiment of the invention, the silicone hydride is a substantially linear hydrogen siloxane having a formula selected from the group consisting of $MD_eD'_fM$
$MD'_fM$
$MD_eD'_fM'$
$M'D_eD'_fM'$, and
$M'D_eM'$ where M is defined as $R_3SiO_{1/2}$
M' is defined as $H_gR_{3-g}SiO_{1/2}$
$D=RRSiO_{2/2}$
$D'=RHSiO_{2/2}$ where each R is independently a monovalent hydrocarbon of from about 1 to 40 carbon atoms, the subscripts e and f may be zero or positive wherein the sum of e and f ranges from about 10 to about 100, with the proviso that the sum of f and g is at least is at least 2.

In another embodiment of the invention R includes substituted or unsubstituted aryl, alkaryl or alkyl radicals.

In another embodiment of the invention M' is a dimethylstyrylsiloxy group and R is styryl.

The crosslinking is performed under silicone hydrosilylation conditions, employing in addition to the above silicone hydride, a hydrosilylation catalyst, and optionally a hydrosilylation inhibitor. Formulated adhesive coating is applied onto a substrate, i.e., a film such as polyester, polyamide, etc., followed by removal of solvent(s) if present and cure at elevated temperatures.

The hydrosilylation catalyst is selected from the group consisting of catalysts comprising a metal selected from the group consisting of nickel, palladium, platinum, rhodium, iridium, ruthenium and osmium or as taught in U.S. Pat. Nos. 3,159,601; 3,159,662; 3,419,593; 3,715,334; 3,775,452 and 3,814,730 incorporated herein by reference.

For compositions of this invention which are to be used in the coating method of this invention, the amount of hydrosilylation catalyst component to be used is preferably sufficient to provide from 10 to 500 parts by weight metal per one million parts by weight of adhesive on 100% by weight of solids.

Inhibitors for the hydrolsilylation metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420; 4,347,346 and 5,506,289; ethylenically unsaturated isocyanates, U.S. Pat. No. 3,882,083; olefinic siloxanes, U.S. Pat. No. 3,989,667; unsaturated hydrocarbon diesters, U.S. Pat. Nos. 4,256,870; 4,476,166 and 4,562,096, and conjugated ene-ynes. U.S. Pat. Nos. 4,465,818 and 4,472, 563; other organic compounds such as hydroperoxides, U.S. Pat. No. 4,061,609; ketones, U.S. Pat. No. 3,418,731; sulfoxides, amines, phosphines, phosphites, nitrites, U.S. Pat. No. 3,344,111; diaziridines, U.S. Pat. No. 4,043,977; half esters and half amides, U.S. Pat. No. 4,533,575; and various salts, such as U.S. Pat. No. 3,461,185. It is believed that the compositions of this invention can comprise an inhibitor from any of these classes of inhibitors.

The inhibitors may be selected from the group consisting of ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated ene-ynes, hydroperoxides, ketones, sulfoxides, amines, phosphines, phosphites, nitrites, and diaziridines.

D. Solvent Resistant Adhesive Compositions

Pressure sensitive adhesive compositions of superior solvent-resistance can be obtained with the polyurethanes or polyurethane-ureas compositions described above. In addition to the polyurethanes or polyurethane-ureas, a solvent-resistant pressure sensitive adhesive composition in accordance with the invention will typically include one or more additives such as fillers, tackifiers, silane adhesion promoters, plasticizers, solvents, thixotropic agents, UV stabilizers, antioxidants, cure catalysts, etc., in the usual amounts.

Typical fillers suitable for addition to the pressure-sensitive adhesive compositions of this invention include fumed silica, precipitated silica and calcium carbonates. Treated calcium carbonates having particle sizes from about 0.07 µm to about 4 µm are particularly useful and are available under several trade names: Ultra Pflex, Super Pflex, Hi Pflex from Specialty in Minerals; Winnofil SPM, SPT from Zeneca Resins; Hubercarb lat, Hubercarb 3 Qt and Hubercarb W from Huber and Kotomite from ECC. These fillers can be used either alone or in combination. The fillers can comprise up to about 200 parts per 100 parts of the polymer component(s) with from about 80 to about 150 parts filler per 100 parts polymer being suitable for many adhesive applications.

The pressure sensitive adhesive composition can contain from about 20 to about 60 parts, and advantageously from about 30 to about 50 parts, of one or more known of conventional tackifiers per 100 parts of polymer. Examples of suitable tackifiers are MQ silicone resins (for which a curing catalyst such as benzoyl peroxide will ordinarily be included), terpene oligomers, coumarone/indene resins, aliphatic, petrochemical resins, and modified phenolic resins.

Adhesion promoters can be employed at levels of from about 0.5 to about 5 parts per hundred parts of the polymer compositions with from about 0.8 to about 1.5 parts per hundred parts polymer being especially advantageous. Suitable adhesion promoters include Silquest A-1120 silane, Silquest A-2120 silane, Silquest A-1170 silane and Silquest A-187 silane, all of which are available from GE Silicones.

Exemplary plasticizers include phthalates, dipropylene and diethylene glycol dibenzoates and mixtures thereof, epoxidized soybean oil, and the like. Dioctyl and diisodecylphthalate are commercially available under the trade names Jayflex DOP and JayFlex DIDP from Exxon Chemical. The dibenzoates are available as Benzoflex 9-88, Benzoflex 50 and Benzoflex 400 from Velsicol Chemical Corporation. Epoxidized soybean oil is available from Houghton Chemical Corporation as Flexol EPO. The plasticizer can comprise up to about 100 parts of the polyurethane polymer with from about 40 to about 80 parts per hundred parts of polymer being satisfactory in many cases.

Useful solvents include aromatic, aliphatic and esters ranging in amounts of from about 25 to about 75 per hundred parts by weight of polyurethane polymer.

Illustrative of useful thixotropic agents are various castor waxes, fumed silica, treated clays and polyamides. These additives typically comprise about 1 to about 10 parts per hundred parts of polyurethane or polyurethane-urea polymer with from about 1 to about 6 parts being useful for most applications. The thixotropes include those available as: Aerosil from Degussa, Cabo-Sil TS 720 from Cabot, Castorwax from CasChem, Thixatrol and Thixcin from Rheox and Dislon from King Industries. If the thixotrope is reactive with silane (e.g., silica), adjustments to the amount formulated may be needed to compensate therefor.

UV stabilizers and/or antioxidants can be incorporated into the pressure sensitive adhesive compositions of this invention in an amount of from 0 to about 5 parts per hundred parts polyurethane polymer with from about 0.5 to about 2 parts providing generally good results. These materials are available from Ciba-Geigy under the trade names Tinuvin 770, Tinuvin 327, Tinuvin 213, Tinuvin 622 and Irganox 1010.

The following examples are illustrative of the polymers of this invention and solvent-resistant pressure sensitive adhesive compositions containing same. It has been found that particular polyurethane or polyurethane-urea adhesive compositions offer excellent solvent resistance. The compositions illustrated by the examples below are for monofunctional terminated polyurethane compositions, which are further crosslinked via peroxide or silicone hydrosilylation.

Example 1

To a resin reaction vessel equipped with mixing capability, condenser, nitrogen atmosphere and heating was added 48.0 g of hydroxyl terminated polybutadiene Krasol LBH-P 2000 resin containing a hydroxyl number of 46, 52.0 g of hydroxyl terminated polybutadiene Krasol LBH-P 5000 resin containing a hydroxyl number of 21.4, and 100.0 g of ethylacetate. Refluxing for 1 hour dried the mixture followed by cooling to below 40° C. Next 13.0 g of isophorone diisocyanate was added for an NCO/OH equivalent ratio of 1.85 then agitated for 60 minutes. To this was added 0.05 g of a 10 wt % toluene solution of dibutyltin dilaurate with continued agitation for 15 minutes. The reactants were heated at 60-70° C. until the wt % NCO as determined per standard titration methodology was found to be 1.09 wt %. At this point 5.9 g of N-ethylbutylamine was added and agitation continued at temperature for 1 hour followed by cooling to room temperature. Approximately a 15 g sample of the reaction product was dissolved in 3.75 g of toluene having 0.02 g benzoyl peroxide dissolved. This was bar coated onto a 2 mil polyester film to yield a 1 mil dry adhesive thickness air dried 10 minutes then cured for 5 minutes at 150° C. Lap shear samples were prepared with 0.25 inch×1.0-inch overlap onto a smooth surface Delrin plaque and glass slide with a 100 g weight. The lap shear samples were suspended in xylene that was agitated using a magnetic stirrer bar. Testing was in duplicate and times to failure were >5 hours and >24 hours respectively.

Example 2

Example 1 was repeated at an NCO/OH equivalent ratio of 1.35. The smooth polyoxymethylene plaque time to failure was >5 hours and on a glass slide 2.6 hours.

Example 3

To a resin reaction vessel equipped with mixing capability, condenser, nitrogen atmosphere and heating was added 38.4 g of hydroxyl terminated polybutadiene Krasol LBH-P 2000 resin containing a hydroxyl number of 47.1, 41.6 g of hydroxyl terminated polybutadiene Krasol LBH-P 5000 resin containing a hydroxyl number of 21.4, 20.0 g of hydroxyl terminated polybutadiene Poly bd R45HTLO resin containing a hydroxyl number of 45.4 and 107.9 g of ethylacetate. The mixture was refluxed for 1 hour, dried and followed by cooling to below 40° C. To this was added 0.05 g of a 10 wt % toluene solution of dibutyltin dilaurate with agitation for 15 minutes. Next 7.9 g of isophorone diisocyanate was added for an NCO/OH equivalent ratio of 1.1 and agitated for 60 minutes. The reactants were heated at 70-80° C. until the wt % NCO was determined per standard methodology to be 0.15 wt %. At this point 0.8 g of N-ethylbutylamine was added and agitation continued at temperature for 1 hour followed by cooling to room temperature. A sample of an approximately 15 g sample of the reaction product was dissolved in 4.8 g toluene, and crosslinked with 0.02 g $M'_{0.9}D_{2.8}D^H_{7.2}M_{0.2}$ where M' is a dimethylstyrylsiloxy group, in the presence of 25 ppm rhodium using an ethanol solution of tris(dibutylsulfide)rhodium(III)trichloride containing 1.4 wt % rhodium as hydrosilylation catalyst. The resulting product was bar coated onto 2 mil polyester film to yield an approximate 1.7 mil dry adhesive thickness. The adhesive was air dried 10 minutes, followed by 5 minutes at 75° C. then cured for 10 minutes at 150° C. Lap shear samples were prepared with 0.25 inch×1.0 inch overlap onto a textured surface Delrin (polyoxymethylene) cassette with a 10 g weight attached to the opposite end. The Delrin cassette was pre-heated 1 minute at 150° C. Time to failure was 4 hours 10 minute.

Example 4

To a resin reaction vessel equipped with mixing capability, condenser, nitrogen atmosphere and heating was added 72.5 g of hydroxyl terminated polybutadiene Krasol$^C$ LBH-P 2000 resin containing a hydroxyl number of 46, 145.0 g of hydroxyl terminated polybutadiene Krasol$^C$ LBH-P 5000 resin containing a hydroxyl number of 21.7, 32.5 g of hydroxyl terminated polybutadiene Poly$^C$bd R20LM resin containing a hydroxyl number of 101 and 398.2 g of ethylacetate. The mixture was refluxed for 2 hours, dried and followed by cooling to 75-80° C. To this was added 0.05 g of a 10 wt % toluene solution of dimethylbis[(1-oxoneodecyl) oxy]stannane with agitation for 15 minutes. Next 18.5 g of isophorone diisocyanate was added for an NCO/OH equivalent ratio of 0.945. The reactants were heated at 75-80° C. until the wt % NCO was determined per standard methodology and found to be 0.0 wt % followed by cooling to room temperature. A sample of an approximately 10 g sample of the reaction product was dissolved in 2.5 g ethyl acetate, and crosslinked with 1.0 g of a 1 wt % ethyl acetate solution of $M_1D_{17}D^H_{13}M_1$ where M is a trimethylsiloxy group, 0.08 g of a 1 wt % ethyl acetate solution of diallylmaleate inhibitor, in the presence of 0.04 g of a platinum divinyltetramethyldisiloxane containing 1 wt % platinum as hydrosilylation catalyst. The product was bar coated onto 2 mil polyester film to yield an approximate 1.5 mil dry adhesive thickness. The adhesive was air dried 10 minutes, followed by 3 minutes at 120° C. Lap shear samples were prepared with 1.0 inch×1.0 inch overlap onto a glass slide with a 10 g weight attached to the opposite end. The time to failure was 24 hours and the adhesive did not dissolve. A control sample of the unsaturated polyurethane was prepared without hydrosilylation crosslinking and tested in accordance with the same procedure. The time to failure was 5 hrs. and the adhesive dissolved. The crosslinked unsaturated polyurethane was tested for shear adhesion failure temperature with 1.0 inch×1.0 inch overlap and 1 Kg weight. The failure temperature was determined to be 119° C. The control sample of polyurethane that was not crosslinked failed at 59° C. under the same test conditions, demonstrating the effectiveness in hydrosilylation crosslinking to improve the shear property of the composition.

Example 5

To a resin reaction vessel equipped with mixing capability, condenser, nitrogen atmosphere and heating was added 72.5 g of hydroxyl terminated polybutadiene Krasol$^C$ LBH-P 2000 resin containing a hydroxyl number of 46, 145.0 g of hydroxyl terminated polybutadiene Krasol$^C$ LBH-P 5000 resin containing a hydroxyl number of 21.7, 32.5 g of hydroxyl terminated polybutadiene Poly$^C$bd R20LM resin containing a hydroxyl number of 101 and 398.2 g of ethylacetate. The mixture was refluxed for 2 hours, dried and followed by cooling to 75-80° C. To this was added 0.05 g of a 10 wt % toluene solution of dimethylbis[(1-oxoneodecyl) oxy]stannane with agitation for 15 minutes. Next 18.5 g of isophorone diisocyanate was added for an NCO/OH equivalent ratio of 0.945. The reactants were heated at 75-80° C. until the wt % NCO was determined per standard methodology and found to be 0.0 wt % followed by cooling to room temperature. A sample of an approximately 10 g sample of the reaction product was dissolved in 2.5 g ethyl acetate, and crosslinked with 1.0 g of a 1 wt % ethyl acetate solution of g $M'_{0.9}D_{2.8}D^H_{7.2}M_{0.2}$ where M' is a dimethylstyrylsiloxy group, in the presence of 0.08 g of a 1 wt % ethyl acetate solution of diallylmaleate inhibitor, 0.04 g of a platinum divinyltetramethyldisiloxane containing 1 wt % platinum as hydrosilylation catalyst. The product was bar coated onto 2 mil polyester film to yield an approximate 1.5 mil dry adhesive thickness. The adhesive was air dried 10 minutes, followed by 3 minutes at 120° C. Lap shear samples were prepared with 1.0 inch×1.0 inch overlap onto a glass slide with a 10 g weight attached to the opposite end. The time to failure was 2.5-3 hours and the adhesive did not dissolve. The crosslinked unsaturated polyurethane was tested for shear adhesion failure temperature with 1.0 inch×1.0 inch overlap and 1 Kg weight. The failure temperature was determined to be 120° C. A control sample of the unsaturated polyurethane that was not crosslinked was prepared and tested in accordance with the same procedure. The control sample failed at 59° C., thereby demonstrating the effectiveness in hydrosilylation crosslinking to improve the shear property of the composition.

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A solvent resistant adhesive composition comprising:
   (i) a hydroxyl terminated or urea terminated or hydrocarbon terminated unsaturated polyurethane derived from a hydroxyl-terminated vinyl-containing branched butadiene polymer, wherein the butadiene polymer has a molecular weight (Mn) of from 500 to 10,000, an average content of copolymerized additional monomer of from 0 to 50 weight percent, hydroxyl groups per polymer of from 2.4 to 2.8 and terminal hydroxyl groups bonded to carbon atoms adjacent to double bonded carbon atoms, and a polyisocyanate and,
   (ii) a peroxide capable of generating free radicals or a silicone hydride providing SiH, wherein components (i) and (ii) are present in an amount sufficient to provide a molar ratio of unsaturated sites of component (i) relative to SiH or free radicals of component (ii) between 514 and 824,
   wherein the silicone hydride is a substantially linear hydrogen siloxane having a formula selected from the group consisting of $MD_eD'_fM$, $MD'_fM'$, $M'D_eD'_fM'$ and $M'D_eM'$, wherein
   M is defined as $R_3SiO_{1/2}$
   M' is defined as $H_gR_{3-g}SiO_{1/2}$
   $D=RRSiO_{2/2}$, and
   $D'=RHSiO_{2/2}$
   where each R is independently a monovalent hydrocarbon radical of from about 1 to 40 carbon atoms, the subscripts e and f may be zero or positive wherein the sum of e and f ranges from about 10 to about 100, with the proviso that the sum of f and g is at least 2; and
   wherein the peroxide is one or more compound selected from the groups consisting of di-tert-butyl peroxide, dicumyl peroxide, cumene hydroperoxide, tert-butyl hydroperoxide, tert-butyl perbenzoate, tert-butyl per-3,5,5-trimethylhexanoate, tert-butyl per-2-ethylhexanoate, and benzoyl peroxide.

2. The composition of claim 1 wherein the unsaturated polyurethane or polyurethane-urea is hydroxyl terminated.

3. The composition of claim 1 wherein the unsaturated polyurethane or polyurethane-urea is urea terminated.

4. The composition of claim 1 wherein the unsaturated polyurethane or polyurethane-urea is hydrocarbon terminated.

5. The composition of claim 1 wherein the unsaturated polyurethane or polyurethane-urea is crosslinked with a peroxide.

6. The composition of claim 1 wherein the unsaturated polyurethane or polyurethane-urea is crosslinked with the silicone hydride in the presence of a hydrosilylation catalyst.

7. The solvent resistant adhesive composition of claim 1 wherein the unsaturated polyurethane or polyurethane-urea is crosslinked with the silicone hydride in the presence of a hydrosilylation catalyst and a hydrosilylation inhibitor.

8. The composition of claim 1 wherein the hydroxyl-terminated polybutadiene contains copolymerizable additional comonomer.

9. The composition of claim 8 wherein the comonomer is selected from the group consisting of ethylene, propylene, 1-butene, isoprene, chloroprene, 2,3-methyl-1,3-butadiene, 1,4-pentadiene, acrylonitrile, methacrylonitrile, methylstyrene, methyl acrylate, methyl methacrylate, vinyl acetate, 1,2-epoxides and ε-caprolactone.

10. The composition of claim 1 wherein the polyisocyanate is selected from the group consisting of 2,4-toluene diisocyanate, 2,6-toluene diisocyanate, 4,4' diphenyl-methanediisocyanate, isophorone diisocyanate, dicyclohexylmethane-4,4'-diisocyanate and liquid diphenylmethane-diisocyantes containing a mixture of 2,4- and 4,4' isomers.

11. The composition of claim 1 wherein R includes substituted or unsubstituted aryl, alkaryl or alkyl radicals.

12. The composition of claim 1 containing at least one additional component selected from the group consisting of filler, tackifier, adhesion promoter, plasticizer, solvent, thixotropic agent, UV stabilizer and antioxidant.

13. The composition of claim 1 further including a tackifier comprising one or more compounds selected from the group consisting of MQ silicone resins, terpene oligomers, coumarone/indene resins, aliphatic petrochemical resins and modified phenolic resins.

14. The composition of claim 1 further including a filler selected from the group consisting of one or more compounds selected from the group consisting of fumed silica, precipitated silica and calcium carbonates.

15. A method for making a cured solvent resistant adhesive composition comprises:
   a) providing a mixture of
      (i) a hydroxyl urea- or hydrocarbon-terminated unsaturated polyurethane derived from a hydroxyl-terminated vinyl-containing branched butadiene polymer, wherein the butadiene polymer has a molecular weight (Mn) of from 800 to 5,000 gram/mole, a primary hydroxyl group content of from 0.3 to 1.8 meq/g, an average content of copolymerizable additional monomer of from 0 to 50 weight percent, hydroxyl groups per polymer of from 2.4 to 2.8 and terminal hydroxyl groups bonded to carbon atoms adjacent to double bonded carbon atoms, and a polyisocyanate; and,
      (ii) a peroxide capable of generating free radicals or a silicone hydride providing SiH, wherein components (i) and (ii) are present in an amount sufficient to provide a molar ratio of unsaturated sites of component (i) relative to SiH or free radicals of component (ii) between 514 and 824, and,
   b) crosslinking the mixture of step (a) at elevated temperatures,
   wherein the silicone hydride is a substantially linear hydrogen siloxane having a formula selected from the group consisting of $MD_eD'_fM$, $MD'_fM$, $MD_eD'_fM'$, $M'D_eD'_fM'$ and $M'D_eM'$, wherein
   M is defined as $R_3SiO_{1/2}$
   M' is defined as $H_gR_{3-g}SiO_{1/2}$
   $D=RRSiO_{2/2}$ and
   $D'=RHSiO_{2/2}$
   where each R is independently a monovalent hydrocarbon radical of from about 1 to 40 carbon atoms, the subscripts e and f may be zero or positive wherein the sum of e and f ranges from about 10 to about 100, with the proviso that the sum off and g is at least 2; and
   wherein the peroxide is one or more compound selected from the groups consisting of di-tert-butyl peroxide, dicumyl peroxide, cumene hydroperoxide, tert-butyl hydroperoxide, tert-butyl perbenzoate, tert-butyl per-3, 5,5-trimethylhexanoate, tert-butyl per-2-ethylhexanoate, and benzoyl peroxide.

16. The method of claim 15 wherein the unsaturated polyurethane or polyurethane-urea is hydroxyl terminated and prepared by the reaction of a polyisocyanate with a stoichiometric excess of hydroxyl terminated butadiene polymer.

17. The method of claim 15 wherein the unsaturated polyurethane or polyurethane-urea is urea terminated and prepared by the reaction of a hydroxyl terminated butadiene polymer with a stoichiometric excess of polyisocyanate and primary or secondary organic amines.

18. The method of claim 15 wherein the unsaturated polyurethane or polyurethane-urea is hydrocarbon terminated and prepared by the reaction of a hydroxyl terminated butadiene polymer with a stoichiometric excess of a monoisocyanate.

19. The method of claim 15 wherein the unsaturated polyurethane or polyurethane-urea is crosslinked with a peroxide.

20. A cured composition provided by the method of claim 15.

* * * * *

UNITED STATES PATENT AND TRADEMARK OFFICE
CERTIFICATE OF CORRECTION

| | | |
|---|---|---|
| PATENT NO. | : 7,956,123 B2 | Page 1 of 1 |
| APPLICATION NO. | : 11/257169 | |
| DATED | : June 7, 2011 | |
| INVENTOR(S) | : Roy Melvin Griswold et al. | |

It is certified that error appears in the above-identified patent and that said Letters Patent is hereby corrected as shown below:

In claim 1, column 11, line 31, "consisting of $MD_eD'_fM$, $MD'_fM'$, $M'D_eD'_fM'$ and" should read --consisting of $MD_eD'_fM$, $MD'_fM$, $MD_eD'_fM'$, $M'D_eD'_fM'$ and--

In claim 15, column 12, line 63, "the sum off and g is at least 2" should read

--the sum of f and g is at least 2--

Signed and Sealed this
Eighteenth Day of October, 2011

David J. Kappos
*Director of the United States Patent and Trademark Office*